United States Patent [19]

Taguchi et al.

[11] Patent Number: 4,788,261

[45] Date of Patent: Nov. 29, 1988

[54] POLYARYLENE SULFIDE RESIN COMPOSITION

[75] Inventors: Yoshio Taguchi, Tokorozawa; Youichi Imai, Saitama; Tadashi Niwa, Saitama; Masayuki Kato, Saitama; Chihiro Imai, Yokohama, all of Japan

[73] Assignee: Toa Nenryo Kogyo Kabushiki Kaisha, Tokyo, Japan

[21] Appl. No.: 77,865

[22] Filed: Jul. 27, 1987

[30] Foreign Application Priority Data

Jul. 30, 1986 [JP] Japan ................. 61-177859

[51] Int. Cl.[4] .............................. C08L 81/02
[52] U.S. Cl. .................... 525/452; 525/417; 525/419; 525/537
[58] Field of Search ............ 525/453, 537, 417, 419, 525/452

[56] References Cited

U.S. PATENT DOCUMENTS

| Re. 30,067 | 8/1979 | Patton | 525/419 |
|---|---|---|---|
| 3,609,113 | 9/1971 | Witten-Bommon et al. | 524/104 |
| 4,017,555 | 4/1977 | Alvarez | 525/419 |
| 4,110,318 | 8/1978 | Giesecke et al. | 528/73 |
| 4,147,684 | 4/1979 | Patton | 524/169 |
| 4,177,320 | 12/1979 | Yoshimura et al. | 428/419 |
| 4,492,730 | 1/1985 | Oishi et al. | 428/473.5 |

FOREIGN PATENT DOCUMENTS 68695 1/1983 European Pat. Off. .

OTHER PUBLICATIONS

Patent Abstracts of Japan, vol. 7, No. 7 (C-144), [1152], 12th Jan. 1983, JP-A-57 164130 (Toray K. K.).

Primary Examiner—John C. Bleutge
Assistant Examiner—David W. Woodward
Attorney, Agent, or Firm—Wenderoth, Lind & Ponack

[57] ABSTRACT

A polyarylene sulfide resin composition with an improved moldability and heat resistance is provided which comprises (a) 40 to 99% by weight of a polyarylene sulfide resin and (b) 1 to 60% by weight of a polyparabanic acid having the following recurring unit:

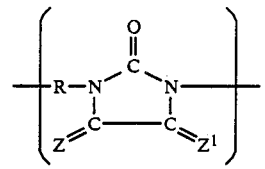

wherein Z and $Z^1$ are oxygen atoms or NH group, Z and $Z^1$ being not simultaneously NH groups, and R is

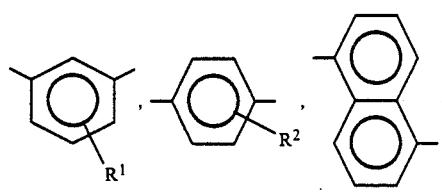

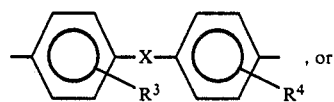 , or

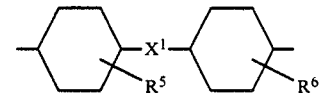

wherein $R^1$, $R^2$, $R^3$, $R^4$, $R^5$ and $R^6$ are hydrogen atoms or methyl groups, and X and $X^1$ are bonds, $CH_2$ groups, oxygen atoms, sulfur atoms, $SO_2$ groups, CO groups or

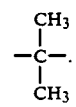

5 Claims, No Drawings

POLYARYLENE SULFIDE RESIN COMPOSITION

BACKGROUND OF THE INVENTION

1. Field of the Invention

This invention relates to a resin composition with an excellent moldability and heat resistance or heat durability, comprising a polyarylene sulfide resin and polyparabanic acid.

2. Description of the Prior Art

Polyarylene sulfide resins have been watched as engineering plastics because of being excellent in flame retarding property, chemical resistance, heat resistance and melt flowability. Compositions comprising polyarylene sulfide resins and polyimide resins or polyamideimide resins are known as those proposed so as to improve the heat resistance of the polyarylene sulfide resins, for example, in Japanese Patent Application OPI (Kokai) No. 73228/1978 and Japanese Patent Publication No. 45506/1981.

On the other hand, polyparabanic acid has a high glass transition temperature such that it is suitable for use in, for example, industrial parts requiring heat resistance, but it can hardly be subjected to molding, e.g. extrusion molding, because it tends to decompose at a temperature somewhat higher than the glass transition temperature. Thus, various proposals have been made as to plasticization of polyparabanic acid, for example, as disclosed in a composition comprising polyparabanic acid and a plasticizing amount of an N,N-dialkyl aromatic sulfonamide (Japanese Patent Application OPI (Kokai) No. 119551/1979) or a composition comprising polyparabanic acid and a plasticizer, to which a polyether sulfone or polyester of terephthalic acid is added (Japanese Patent Application OPI (Kokai) No. 13656/1983).

SUMMARY OF THE INVENTION

It is an object of the present invention to provide a polyarylene sulfide resin composition having an improved moldability and heat resistance or heat durability.

It is another object of the present invention to provide a polyphenylene sulfide resin composition with an increased heat resistance and improved melt moldability without deteriorating the properties of polyphenylene sulfide resin.

These objects can be attained by a polyarylene sulfide resin composition comprising (a) 40 to 99% by weight of a polyarylene sulfide resin and (b) 1 to 60% by weight of a polyparabanic acid having the following recurring unit:

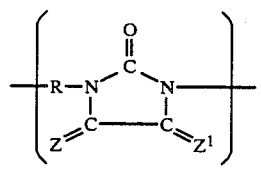

wherein Z and $Z^1$ are oxygen atoms or NH groups, Z and $Z^1$ being not simultaneously NH groups, and R is

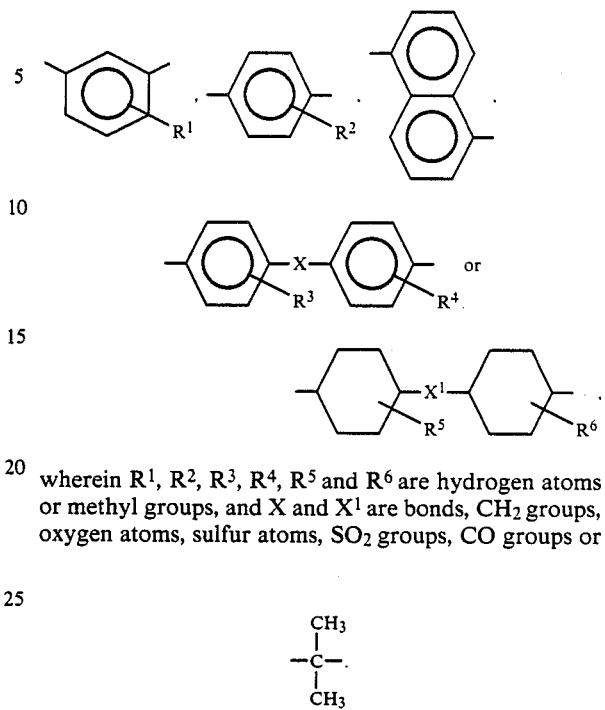

wherein $R^1$, $R^2$, $R^3$, $R^4$, $R^5$ and $R^6$ are hydrogen atoms or methyl groups, and X and $X^1$ are bonds, $CH_2$ groups, oxygen atoms, sulfur atoms, $SO_2$ groups, CO groups or $$-\underset{\underset{CH_3}{|}}{\overset{\overset{CH_3}{|}}{C}}-.$$

DETAILED DESCRIPTION OF THE INVENTION

The inventors have made various efforts to improve the heat resistance of a polyarylene sulfide resin and consequently, have found that blending of a polyparabanic acid is effective for this purpose. The present invention is based on this finding.

Accordingly, the present invention provides a polyarylene sulfide resin composition comprising (a) 40 to 99% by weight, preferably 60 to 95% by weight of a polyarylene sulfide resin and (b) 1 to 60% by weight, preferably 5 to 40% by weight of a polyparabanic acid.

In the composition of the present invention, the polyarylene sulfide (hereinafter referred to as PAS) resin has a recurring unit represented by the general formula ${-Ar-S-}$ wherein —Ar— is, for example,

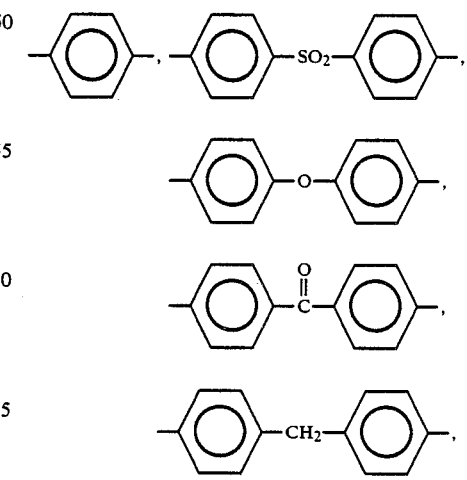

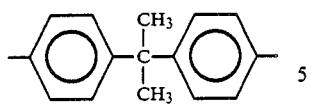

or the like. These aromatic groups can be substituted by substituents such as fluorine, chlorine, bromine, methyl group and the like.

Typical of the above described PAS resin are polyphenylene sulfides (hereinafter referred to as PPS) represented by the general formula

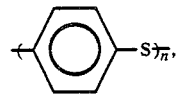

wherein n is about 10–1000, which are commercially available under a commercial name "RYTON" from Phillips Petroleum Co. in USA, and which can, for example, be prepared by reacting

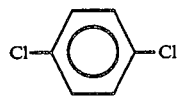

and $Na_2S \cdot H_2O$ in a solvent of N-methylpyrrolidone at a temperature of 160° to 250° C. under pressure, as disclosed in Japanese Patent Publication No. 3368/1970.

The PAS resin used in the present invention is one having a melt viscosity of 100 to 500,000 poises at 300° C.

The polyparabanic acid used in the present invention has the following recurring unit (hereinafter referred to as Unit (I)):

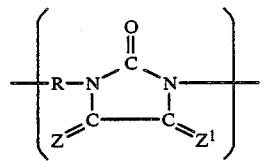

wherein Z and $Z^1$ are oxygen atoms or NH group, Z and $Z^1$ being not simultaneously NH groups, and R is

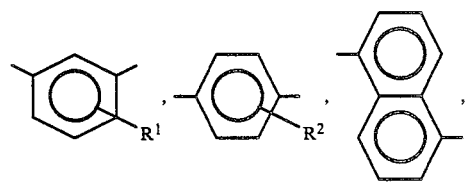

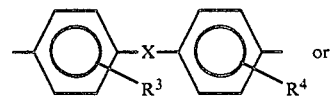

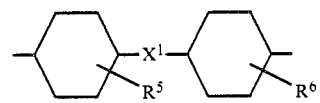

wherein $R^1$, $R^2$, $R^3$, $R^4$, $R^5$ and $R^6$ are hydrogen atoms or methyl groups, and X and $X^1$ are bonds, $CH_2$ groups, oxygen atoms, sulfur atoms, $SO_2$ groups, CO groups or

In particular, R is preferably:

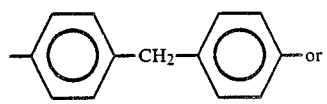

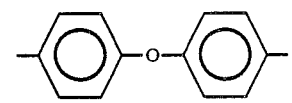

Preferably, the polyparabanic acid is a polymer where 75% or more has the following recurring unit (hereinafter referred to as Unit (II)):

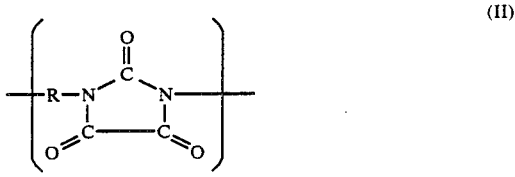

(II)

wherein R has the same meaning as described above.

The polymer having Unit (I) is known and can be prepared by, for example, reacting a diisocyanate represented by the general formula OCN—R—NCO wherein R has the same meaning as described above with hydrogen cyanide, as disclosed in U.S. Pat. No. 3,661,859.

The polyparabanic acid consisting of at least 75% of Unit (II), used in the present invention, can be obtained by hydrolyzing a polymer consisting of Unit (I). This method is carried out by subjecting the polymer consisting of Unit (I) to hydrolysis in the presence of an aqueous solution of a Broensted acid such as hydrochloric acid, hydrobromic acid, sulfuric acid or phosphoric acid, anhydrous hydrogen chloride or anhydrous hydrogen bromide, for example, as disclosed in U.S. Pat. No. 3,661,859 and Japanese Patent Application OPI (Kokai) No. 179230/1983. A proportion of at least 75% of Unit (II) can be controlled by broadly varying the hydrolysis conditions, namely, the concentration or quantity of Broensted acid, temperature and time.

Examples of the diisocyanate represented by the foregoing general formula, used for the production of a polymer consisting of Unit (I), are m-phenylene diisocyanate, 2,4-toluene diisocyanate, p-phenylene diisocyanate, 1,5-naphthalene diisocyanate, 4,4'-biphenyl diisocyanate, tolidine diisocyanate, 4,4'-diphenylether diisocyanate, 4,4'-diphenylthioether diisocyanate, 4,4'-diphenylisopropylidene diisocyanate, 4,4'-dicyclohexylmethane diisocyanate, 4,4'-diphenylmethane diisocyanate and the like. Above all, 4,4'-biphenyl diisocyanate, 4,4'-diphenylether diisocyanate and 4,4'-diphenylmethane diisocyanate are preferable.

The polyparabanic acid used in the present invention has preferably a viscosity $\eta_{inh}$ of 0.1 to 5.0 (0.5 g/100 ml dimethylformamide, 30° C.).

The composition of the present invention comprises 40 to 99% by weight, preferably 60 to 95% by weight of PAS resin and 60 to 1% by weight, preferably 40 to 5% by weight of the polyparabanic acid. If the quantity of PAS resin is less than 40% by weight, the moldability is insufficient, while if more than 99% by weight, the heat resistance or durability is not so improved.

For the purpose of improving the mechanical strength of the composition of the present invention, other components can be added thereto, for example, at most 60% by weight of fibrous fillers such as glass fibers, carbon fibers, boron fibers, silicon carbide fibers, asbestos fibers, metallic fibers and the like and at most 40% by weight of powdered fillers such as calcium carbonate, mica, silica, alumina, talc, barium sulfate, clay, kieselguhr and other metal oxides.

Preparation of the composition of the present invention can be carried out by previously dry-blending PAS resin and polyparabanic acid optionally with other components and then melting and kneading the mixture. The melting and kneading can generally be carried out using an extruder, Banbury mixer, kneader and heated rolls, which are commonly used for melting and kneading rubbers or plastics. The kneading temperature is adjusted to a range of a temperature where the resin components can be melted to a temperature of thermal decomposition thereof and is ordinarily chosen from a range of 280° to 360° C.

The composition of the present invention can readily be melted and molded and the thus resulting moldings are excellent in heat resistance and mechanical properties.

Because of these excellent properties, the composition of the present invention is useful for automobile parts, electric and electronic parts, special mechanical parts and the like.

The following examples are given in order to illustrate the present invention in detail without limiting the same, in which percents of components are to be taken as those by weight and tests are carried out according to the following standards or procedures.

(1) Tensile Strength and Elongation: JIS K 6301
(2) Flexural Modulus: JIS K 7203
(3) Heat Resistance: A weight decrease at 360° C. is measured by a thermogravimetric analysis (TGA) at a temperature raising rate of 10° C./min in a nitrogen atmosphere using a thermobalance (R-TG Type, commercial name manufactured by Rigaku Denki KK).

EXAMPLES 1 TO 5 AND COMPARATIVE EXAMPLES 1 AND 2

PPS resin (RYTON P4 and R4—commercial name—manufactured by Phillips Petroleum Intl., Ltd.), polyparabanic acid powder (TRADLON—commercial name—manufactured by Exxon Chemical Co., $\eta_{inh}=1.0$ or less, hereinafter referred to as PPA resin), glass fiber (03 JA 404—commercial name—manufactured by Asahi Fiber Glass Co.) and calcium carbonate (Homocal-D—commercial name—manufactured by Shiraishi Kogyo KK) were dry-blended in proportions as shown in Table 1, fed to an extruder where the mixture was melted and kneaded at a temperature of 310° C. and then extruded therefrom to form pellets. Test pieces were molded from the resulting pellets and subjected to measurement of the properties. The moldability was estimated by the possibility of injection molding. The results are shown in Table 1:

TABLE 1

|  | Example | | | | | | Comparative Example | |
|---|---|---|---|---|---|---|---|---|
|  | 1 | 2 | 3 | 4 | 5 | 6 | 1 | 2 |
| PPS Resin (%) | 80(P4) | 60(P4) | 54(P4) | 58(R4) | 100(P4) | 50(P4) | 100(P4) | — |
| PPA Resin (%) | 20 | 40 | 13 | 14 | 20 | 50 | — | 100 |
| Glass Fiber (%) | — | — | 33 | 14 | — | — | — | — |
| Calcium Carbonate (%) | — | — | — | 14 | — | — | — | — |
| Properties of Molding | | | | | | | | |
| Tensile Strength (kg/cm$^2$) | 320 | 260 | 1160 | 760 | 1100 | 240 | 360 | — |
| Elongation (%) | 1 | 1 | 2 | 2 | 2 | 1 | 1 | — |
| Flexural Modulus (kg/cm$^2$) | 28,000 | 30,000 | 110,000 | 108,000 | 119,000 | 30,000 | 30,000 | — |
| Heat Resistance (%) | ≦1 | ≦1 | ≦1 | ≦1 | ≦1 | ≦1 | 3 | ≦1 |
| Injection Molding | yes | yes | yes | yes | yes | yes | yes | no |

What is claimed is:

1. A polyarylene sulfide resin composition comprising a blend of (a) 40 to 99% by weight of a polyarylene sulfide resin and (b) 1 to 60% by weight of a polyparabanic acid having the following recurring unit:

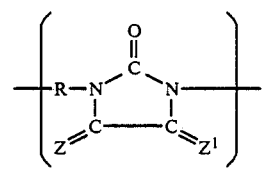

wherein Z and Z$^1$ are oxygen atoms or NH group, Z and Z$^1$ being not simultaneously NH groups, and R is

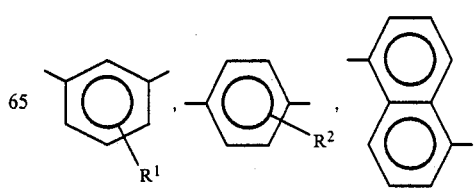

-continued

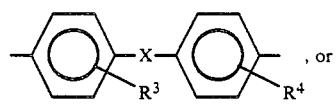, or

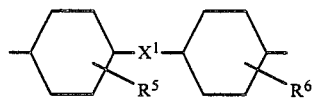

wherein $R^1$, $R^2$, $R^3$, $R^4$, $R^5$ and $R^6$ are hydrogen atoms or methyl groups, and X and $X^1$ are bonds, $CH_2$ groups, oxygen atoms, sulfur atoms, $SO_2$ groups, CO groups or

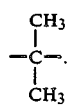

2. The polyarylene sulfide resin composition as claimed in claim 1, wherein the polyarylene sulfide resin has the following recurring unit:

(Ar—S)

wherein Ar is

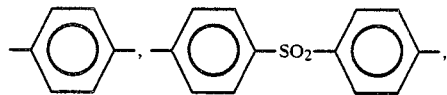

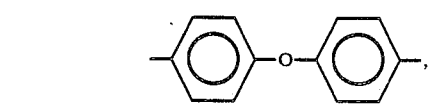

-continued

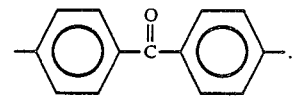

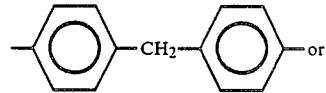, or

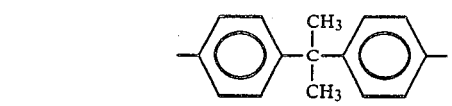

3. The polyarylene sulfide resin composition as claimed in claim 2, wherein the Ar group has at least one substituent selected from the group consisting of fluorine, chlorine, bromine and methyl group.

4. The polyarylene sulfide resin composition as claimed in claim 1, wherein the polyarylene sulfide resin is a polyphenylene sulfide resin represented by the general formula:

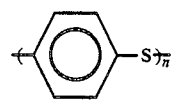

wherein n is about 10–1000.

5. The polyarylene sulfide resin composition as claimed in claim 1, wherein the polyparabanic acid is a polymer consisting of at least 75% of the following recurring unit:

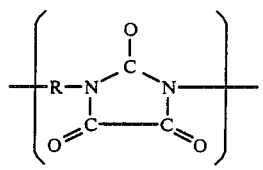

* * * * *